May 21, 1935.  N. H. KNOWLTON  2,001,823
LUBRICATION OF BEARINGS
Filed Jan. 29, 1931
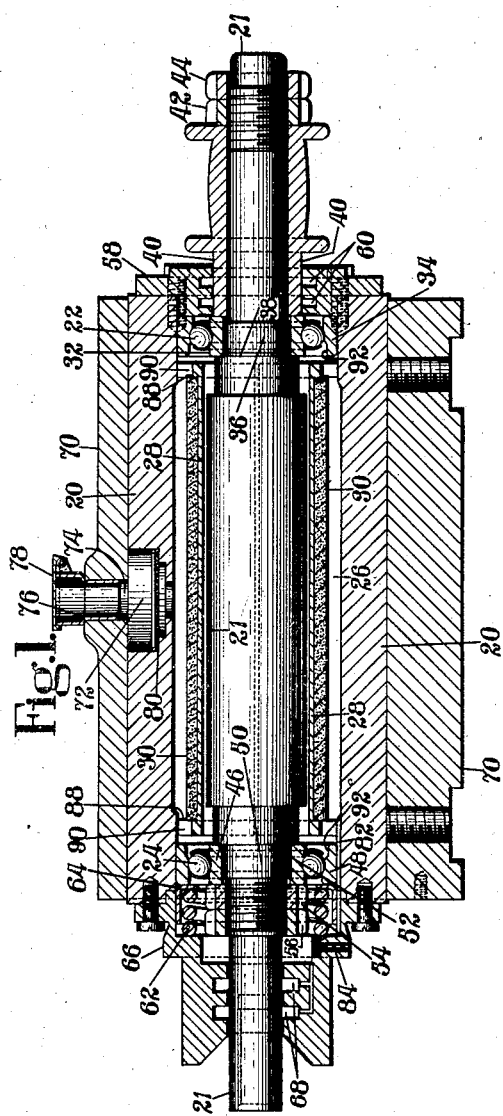
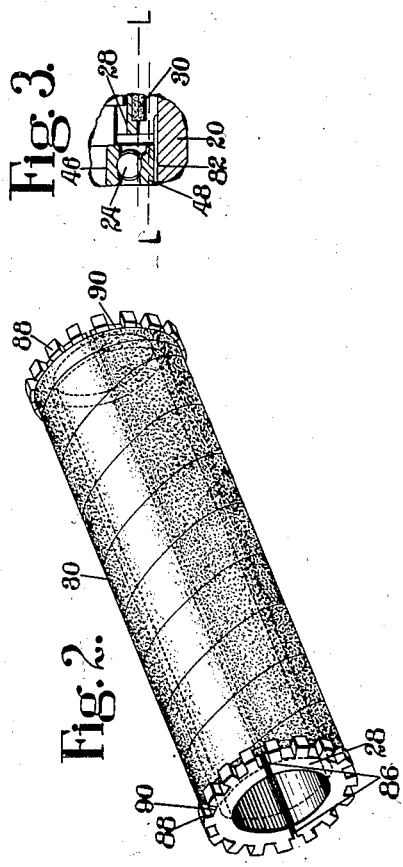
INVENTOR.
Norwood H. Knowlton
By his Attorney.
Harlow M. Davis Patented May 21, 1935

2,001,823

UNITED STATES PATENT OFFICE 2,001,823

LUBRICATION OF BEARINGS

Norwood H. Knowlton, Rockport, Mass., assignor to United Shoe Machinery Corporation, Paterson, N. J., a corporation of New Jersey Application January 29, 1931, Serial No. 512,083

14 Claims. (Cl. 308—121)

This invention relates to improvements in the lubrication of bearings and is illustrated herein with reference to a device for lubricating high-speed bearings of the rolling type.

Whenever it is desired to rotate a member at a high rate of speed it is customary to use an anti-friction bearing such as a roller or ball bearing, in order that the friction between moving parts will be reduced to a minimum, the term "roller bearing" being herein used for convenience to comprehend such anti-friction bearings. Proper lubrication of these bearings is of outstanding importance and it is fundamental that, besides using an oil of proper physical and chemical properties, it is necessary to provide sufficient oil for lubricating purposes to the bearing, but not to provide an excess of oil thereto since the presence of a large volume of oil within the bearing results in high operating temperatures due to the churning of the lubricant and thus impairs the oil as a lubricant by causing sludging of oil or actual disintegration of greases. This condition is likely to result in the freezing of the bearings. Various devices have been used to lubricate rolling bearings, examples being the flinger type in which oil is positively thrown from an oil-retaining pocket to the bearing, or the type in which oil is fed to the bearing by a wick. The flinger type of lubricator is difficult to balance, expensive to build, and tends to heat up the oil since it generally rotates at the same speed as the rotating member to which it is attached. In lubricating bearings by the use of wicks, it is customary either to position the wick above and spaced from the bearing and to allow oil applied to the wick to flow along the wick and to drip intermittently upon the bearing by the aid of gravity or to cause the wick to engage the bearing, while being fed along the wick to the bearing by capillary attraction. In the arrangement in which the flow of oil through the wick is dependent upon gravity it is necessary frequently to supply small quantities of oil to the wick in order that the bearings will receive the proper lubrication. This requires constant attention on the part of the operator or the use of an automatic oil-feeding device. In constructions where the feed of oil to the bearings is dependent upon capillary attraction, if the wick becomes separated from the bearing the supply of oil is cut off therefrom, and in this type of lubricator the end of the wick is sometimes chewed up by the bearings, works into the ball race, and destroys the bearings.

In view of the foregoing, an object of this invention is to provide an improved rolling-bearing-lubricating device which will be simple in construction, effective in operation, requires little attention on the part of the operator, and has none of the above-mentioned disadvantages of the common lubricators. With this object in view and in accordance with a feature of this invention, the illustrated bearing unit comprises means for supplying excessive quantities of lubricant to a rolling bearing during an initial period of relative rotation of a shaft, upon which the bearing is mounted, and a shaft-enclosing casing and means for absorbing lubricant thrown from the bearing to reduce the quantity of lubricant fed to the bearing upon the continued relative movement of the shaft and the bearing.

As illustrated, a chamber formed between the casing and the shaft serves as a reservoir from which oil is supplied to the bearings, the depth of the oil in the chamber controlling the supply of lubricant available for the bearings. When the machine has been standing idle for a short time, the oil stands at its highest level, and when the shaft is first rotated with the oil standing at this level, the bearings are supplied with quantities of oil greater than that required for proper lubrication and are flushed with oil, the surplus oil being atomized and diffusing about the chamber in the form of a fine mist.

To cause the level of the oil in the chamber to drop during the continued operation of the machine in order that during such continued operation of the machine the oil will drop to a predetermined level in the casing thus supplying lubricant to the bearings in quantities sufficient for proper lubrication of the same but not in excess of that amount, and in accordance with a further feature of this invention, the illustrated device is provided with an annulus positioned within the chamber and surrounding the shaft. The annulus, which permanently retains a small quantity of oil, is adapted to absorb the surplus oil which is picked or entrained by the bearing and thrown therefrom as the machine is operated. As the annulus continues to absorb the atomized oil, it becomes wet and oil drips from the lower part of the annulus back to the bottom of the chamber in sufficient quantities to maintain a level such as will cause the bearings to pick up quantities of lubricant sufficient for proper lubrication of the bearings, but not in excess of that amount.

The illustrated device is so designed that when the shaft has been idle for a time, a large portion of the oil soaked up by the annulus drips to the bottom of the chamber and raises its level just above the lower portion of the annulus to the high level above-described. In order to insure that the unit is provided with a quantity of oil sufficient to maintain the lowered level desired for proper lubrication of the bearings during the operation of the machine, the chamber may be supplied with surplus oil through an oil-receiving opening at the top of the machine, the unit, after being supplied with fresh oil, being allowed to remain idle until the quantity of oil not permanently retained by the annulus filters through the same and settles to the bottom of the chamber. The level of the oil in the chamber will thus rise until the oil reaches an overflow opening which determines the maximum quantity of oil which can be retained in the chamber. As above described, when the shaft is first rotated, because of the high level of the oil in the chamber, an excessive amount of oil is supplied to the bearings and surplus oil is thrown from the bearings and is absorbed by the annulus, the oil level in the chamber dropping during this period to the lowered operating level and thus supplying oil in desired predetermined quantities to the bearings.

These and other features of the invention will now be described with reference to the accompanying drawing, in which Fig. 1 shows a longitudinal section of an illustrated bearing unit, the section having been taken along a vertical median plane of the unit;

Fig. 2 is a perspective view of an oil-absorbing annulus which forms part of the bearing unit illustrated in Fig. 1; and Fig. 3 is an enlarged view of a portion of the unit illustrated in Fig. 1, dotted lines having been applied thereto to indicate oil levels in a chamber of the bearing unit when the machine is idle and after the machine has been running for a short period.

The illustrated bearing unit comprises a housing or casing 20, a shaft 21 mounted for rotation upon rolling bearings 22, 24 within the housing, an oil-retaining chamber 26 formed between the housing and the casing, a sleeve 28 supported by the housing 20 and positioned within the chamber 26, and an annulus 30 mounted upon the sleeve 28 and adapted to absorb oil which has been picked up by the bearings from the bottom of the chamber and has been thrown from the bearings, thereby reducing the quantity of oil available for the bearings.

The illustrated rolling bearings 22, 24 are of a conventional open type and are positioned within and near the opposite ends of the housing 20. The bearing 22 comprises inner and outer races 32, 34, respectively, the race 32 having a pressed fit upon a step 36 of the shaft 21 and being screwed against a shoulder 38 on the shaft by a pulley collar 40 secured for rotation with the shaft by a nut 42 and a lock nut 44. The bearing 24 which comprises inner and outer races 46, 48, respectively, is pressed upon a step 50 of the shaft 21 and is screwed against a shoulder 52 formed on the shaft 21 by a nut 54 which is secured in place by a lock nut 56. The right end of the casing is closed by a plate 58 surrounding the collar 40 and assembled therewith prior to mounting the collar 40 on the shaft 21, the plate 58 being screwed to the casing. In order to prevent escape of any of the lubricant from the unit, the plate 58 is provided with oil scupper grooves 60. The shaft 21 and its bearings 22 and 24 are urged axially of the shaft in the casing toward the plate 58 by a spring 62 enclosed within a spring retainer 64 which presses against the outer race 48, and through the bearing 24 the shaft is urged to the right (Fig. 1), forcing the outer race 34 of the bearing 22 against the plate 58 to limit the movement of the shaft toward the right. The respective inner and outer races of the bearings are thus kept in radial alinement. An end plate 66 screwed to the housing 20 closes the left end of the housing and serves as an abutment against which the left end (Fig. 1) of the spring 63 may press, this plate also being provided with scupper grooves 68 for returning oil escaping from the casing and along the shaft 21 back to the bottom of the chamber 26.

The housing or casing 20 is shaped to fit within a main frame 70 of a machine in which this bearing unit is to be incorporated and is provided with an opening 72 through which lubricating oil may be supplied. In order to supply oil to the chamber 26, the main frame is also provided with an opening 74 arranged to register with the opening 72 and into which a cup 76 is inserted. To prevent dirt from entering the chamber 26 the cup 76 is provided with a cover 78 pivotally attached thereto and with a fine mesh screen 80 positioned near the bottom of the opening 72, the latter serving roughly to measure the quantity of oil supplied to the chamber.

When the shaft 21 is stationary, oil entering the opening 72 will be absorbed by the annulus 30 and oil which is not permanently retained by the annulus 30 will drip to the bottom of the chamber 26 to raise the level of the oil to level L'. When this level has been reached, if any more oil enters the chamber it will flow through axially extending grooves 82 and out of an overflow opening 84 the purpose of which will presently appear.

As already stated, in lubricating high-speed bearings it is essential to provide sufficient lubricant to the bearings but too great a quantity of oil supplied thereto results in high operating temperatures and this breaks down the lubricating qualities of the oil and frequently causes destruction of the bearings. It has also been found desirable that the bearings should be well flushed with oil after the unit has been standing idle for a long period and is first operated. Serious overheating of the lubricant does not take place until after the unit has been running for a short period and if the excess supply of oil, which is supplied to the bearings during the initial operation of the unit, is readily disposed of no harm will result and the oil will be supplied to all parts of the bearing and will be heated to a temperature which will increase its fluidity.

It has been found that the device operates quite satisfactorily when the bottom portion of the annulus 30 extends slightly beneath the surface of the oil standing at level L' (Fig. 3), the oil at this level being sufficiently deep to cause the lower portions of the rolling units of the bearings to dip slightly into the oil upon rotation of the shaft. When the shaft is rotated at a high speed a fine mist is thrown around the chamber and is absorbed, except for a small quantity of oil which collects upon the inside wall of the chamber and runs directly to the bottom thereof, the level of the oil dropping after a short period of rotation to a level L.

The sleeve 28 which supports the annulus 30 is split, as clearly indicated by reference numeral 86, and has flanged ends 88 of a suitable diameter to allow the sleeve slidingly to fit into the chamber 26. In order to allow the atomized oil thrown off by the bearings readily to be diffused throughout the chamber 26 and to be soaked up by the annulus 30, the flanges 88 are provided with circumferentially arranged openings 90. Absorption of oil by the annulus 30 which may be made of felt, flannel, or any other well-known substance having oil-absorbing qualities and is wrapped upon the sleeve 28, causes the annulus to become dripping wet, the moisture gradually settling to the bottom of the annulus and dripping to the bottom of the chamber to maintain the level L of the oil as the oil is picked up or entrained by the bearings upon rotation of the same. When the level L is maintained just below the portion 92 of the races 34, 46 it has been found that proper quantities of lubricant are being supplied to the bearings. It requires little oil to lubricate the bearings, a few drops a minute being sufficient in a bearing of the size of the illustrated unit, the felt or flannel in each of the units being of the proper quality and size to supply surplus oil back to the bottom of the chamber at the same rate at which the bearing is picking up the oil from the chamber.

It will be clear when using different sizes and styles of bearing units that the levels L and L' may be varied and that different qualities and quantities of oil-absorbing material may be used. Such changes are within the skill of the ordinary mechanic and the proportions of the parts of various sizes and shapes of bearing units need not be set forth in detail.

Having described my invention, what I claim as new and desire to secure by Letters Patent of the United States is:—

1. A device of the class described having, in combination, a casing, a rolling bearing positioned within the casing, a shaft extending within the casing and engaging the rolling bearing, means for supplying excessive quantities of lubricant to the rolling bearing during an initial period of relative movement of said shaft and said bearing, and a body of absorbent material for accumulating lubricant thrown from the bearing to reduce the quantity of lubricant fed to the bearing upon continued relative movement of the shaft and the casing.

2. A device of the class described having, in combination, a housing, ball bearings positioned within the housing, a shaft extending into the housing and supported by the ball bearings, means for causing excessive quantities of oil to be supplied to the bearings for a short period after the initial rotation of the shaft, and a body of absorbent material positioned and adapted to accumulate surplus oil thrown from the bearings and to feed oil back to the bearings in quantities sufficient to lubricate the same but not in excess of that amount.

3. A bearing unit having, in combination, a housing, a rolling bearing mounted within the housing, a shaft positioned within the housing and mounted for rotation upon said bearing, said shaft being spaced from the housing to form therewith a chamber for receiving oil, the depth of which in the chamber regulates the supply of oil to the bearing, a body of absorbent material positioned within the chamber and adapted to accumulate surplus oil supplied to and thrown from the bearing when the machine is in operation, thereby to reduce the depth of the oil in the chamber and thus to decrease the supply of oil available for the bearing.

4. A bearing unit having, in combination, a housing, a rolling bearing mounted within the housing, a shaft mounted for rotation upon the rolling bearing and spaced from the housing to form therewith a chamber the bottom portion of which serves as an oil reservoir for supplying oil to the bearing, and a sleeve of oil-absorbing material positioned in the chamber and adapted to absorb oil thrown from the bearings upon rotation of the shaft and also to reduce the depth of oil in the chamber upon rotation of the shaft.

5. A bearing unit having, in combination, a housing, rolling bearings mounted within the housing, a shaft positioned within the housing and mounted for rotation upon said bearings, said shaft being spaced from the housing to form therewith a chamber for receiving oil, the depth of which in the chamber regulates the supply of oil to the bearings, and a sleeve of absorbent material within the chamber and surrounding the shaft for absorbing surplus oil supplied to and thrown from the bearings when the machine is in operation for reducing the depth of the oil in the chamber and thereby decreasing the supply of oil to the bearings.

6. A bearing unit having, in combination, a housing, rolling bearings mounted within the housing, a shaft mounted for rotation upon the rolling bearings and spaced from the housing to form therewith a chamber, a sleeve supported by the housing and positioned within the chamber, and material mounted upon the sleeve and adapted to absorb oil which has been picked up by the bearings from the chamber and has been thrown from the bearings, thereby reducing the amount of oil which may be picked up by the chamber and supplied to the bearings.

7. A bearing unit having, in combination, a housing, rolling bearings positioned in spaced relation to each other within the housing, a shaft positioned within the housing and mounted upon the rolling bearings, said shaft being spaced from the housing to form therewith a chamber for receiving oil, the depth of which in the chamber regulates the supply of oil to the bearings, and a sleeve of oil-absorbing material mounted within the chamber and extending substantially from one bearing to the other and spaced from the housing and the shaft for absorbing surplus oil thrown from the bearings when the shaft is first rotated and for reducing upon continued rotation of the shaft the depth of the oil in the chamber.

8. A bearing unit having, in combination, a housing, a rolling bearing mounted within the housing, a shaft positioned within and spaced from the housing and mounted for rotation upon the rolling bearing, means for maintaining in the housing an oil level of sufficient depth to supply excessive quantities of oil to the rolling bearings upon initial rotation of the shaft, and a stationary body of absorbent material positioned between the housing and the shaft and adapted to accumulate a predetermined quantity of the surplus oil thrown off by the bearings, thereby reducing the level of the oil in the housing and therefore the quantity of oil supplied to the bearing upon continued rotation of the shaft.

9. A bearing unit having, in combination, a housing, a rolling bearing mounted within the housing, a shaft positioned within the housing and mounted for rotation upon said bearing, said shaft being spaced from the housing to form therewith a chamber for receiving oil, the depth of which in the chamber regulates the supply of oil to the bearing, and a stationary sleeve surrounding the shaft and positioned within the chamber for absorbing surplus oil supplied to and thrown from the bearing when the machine is in operation to reduce the depth of oil in the chamber, thereby decreasing the supply of oil to the bearing.

10. A bearing unit having, in combination, a housing, a rolling bearing mounted within the housing, a shaft positioned within and spaced from the housing and mounted for rotation upon said bearing, means for causing excessive quantities of oil to be supplied to the rolling bearing during initial rotation of the shaft, and felt positioned between the housing and the shaft and constructed and arranged to absorb a predetermined quantity of oil thrown off by the bearing, thereby reducing the quantity of oil supplied to the bearing after the shaft has been rotating for a short period.

11. A bearing unit having, in combination, a housing, a rolling bearing mounted within the housing, a shaft positioned within the housing and mounted for rotation upon said bearing, said shaft being spaced from the housing to form therewith a chamber for receiving oil the depth of which in the chamber regulates the supply of oil to the bearing, an opening in the housing for supplying fresh quantities of oil to the chamber, an overflow opening for regulating the maximum depth of oil in the chamber, and a body of absorbent material positioned within the chamber and adapted to accumulate surplus oil supplied to and thrown from the bearing when the machine is in operation in order to reduce the depth of oil in the chamber and to decrease the supply of oil available for the bearing.

12. A bearing unit having, in combination, a housing, a rolling bearing positioned within the housing, a shaft extending within the housing and engaging the rolling bearing, a reservoir of considerable capacity positioned laterally of the rolling bearing and having free access to the rolling bearing, said reservoir being constructed to receive oil the level of which regulates the supply of oil to the bearing, and means constructed and arranged to accumulate surplus oil thrown from the bearing and to retard the return of such oil to the reservoir in order gradually to reduce the level of oil in the reservoir after the machine has been started and thereby to reduce the supply of oil available for the bearing.

13. A device of the class described having, in combination, a casing, a shaft extending within the casing, rolling bearings for said shaft spaced apart from each other, a reservoir between said bearings having free access to each of said bearings for supplying excessive quantities of lubricant to said bearings during an initial period of relative movement of said shaft and bearings, and means positioned between said bearings for absorbing lubricant thrown from the bearings upon continued relative movement of the shaft and the casing.

14. A device of the character described having, in combination, a housing, a shaft extending within the housing, rolling bearings for said shaft spaced apart from each other, a reservoir of considerable capacity positioned between said bearings and having free access to each of said bearings, said reservoir being constructed to receive oil the level of which regulates the supply of oil to the bearings, and absorbent material constructed and arranged to accumulate surplus oil thrown from the bearings and to retard the return of such oil to the reservoir in order gradually to reduce the level of oil in the reservoir after the machine has been started and thereby to reduce the supply of oil available for the bearings.

NORWOOD H. KNOWLTON.